(12) United States Patent
Vijaya Kumar et al.

(10) Patent No.: US 12,536,900 B2
(45) Date of Patent: Jan. 27, 2026

(54) REQUESTING AND RECEIVING VEHICLE TELEMETRY DATA

(71) Applicant: GM Global Technology Operations LLC, Detroit, MI (US)

(72) Inventors: Vivek Vijaya Kumar, Shelby Township, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 18/536,832

(22) Filed: Dec. 12, 2023

(65) Prior Publication Data

US 2025/0191465 A1  Jun. 12, 2025

(51) Int. Cl.
*G08G 1/01* (2006.01)
*G08G 1/052* (2006.01)
*H04W 4/44* (2018.01)

(52) U.S. Cl.
CPC ......... *G08G 1/0133* (2013.01); *G08G 1/0112* (2013.01); *G08G 1/0141* (2013.01); *G08G 1/0145* (2013.01); *G08G 1/052* (2013.01); *H04W 4/44* (2018.02)

(58) Field of Classification Search
CPC .. G08G 1/0133; G08G 1/0112; G08G 1/0141; G08G 1/0145; G08G 1/052; H04W 4/44
See application file for complete search history.

(56) References Cited

U.S. PATENT DOCUMENTS

| | | | | |
|---|---|---|---|---|
| 11,516,308 B1 * | 11/2022 | Dubynskiy | ......... | G06F 11/3476 |
| 2013/0013179 A1 * | 1/2013 | Lection | ................ | G08G 1/0145 |
| | | | | 701/117 |
| 2020/0356773 A1 * | 11/2020 | Goyal | .................. | G06V 20/582 |
| 2022/0366782 A1 * | 11/2022 | Grimm | ................ | G08G 1/0112 |

FOREIGN PATENT DOCUMENTS

| | | |
|---|---|---|
| DE | 102012211620 A1 | 1/2013 |
| DE | 102017201048 A1 | 7/2018 |

OTHER PUBLICATIONS

United States Patent and Trademark Office. U.S. Appl. No. 18/308,996, filed Apr. 28, 2023.

* cited by examiner

*Primary Examiner* — Andrew J Cromer
(74) *Attorney, Agent, or Firm* — Vivacqua Crane, PLLC (57) ABSTRACT

A method for requesting and receiving vehicle telemetry data may include receiving telemetry data from one or more of a plurality of vehicles. The method further may include determining a traffic metric based at least in part on the telemetry data. The method further may include comparing the traffic metric to a traffic metric target. The method further may include requesting telemetry data from one or more of the plurality of vehicles based at least in part on comparing the traffic metric to the traffic metric target.

16 Claims, 2 Drawing Sheets

FIG. 1

FIG. 2 ered to include a high side driver capable of providing a voltage to the load and a low side driver capable of providing a ground connection for the load...

REQUESTING AND RECEIVING VEHICLE TELEMETRY DATA

INTRODUCTION

The present disclosure relates to systems and methods for requesting and receiving vehicle telemetry data.

Vehicle telemetry data includes status information about one or more vehicles, including, for example, engine RPM, vehicle speed, fuel level, engine temperature, odometer reading, battery voltage, brake system status, transmission data, tire pressure, GNSS location, acceleration and deceleration, steering angle, suspension system data, exhaust emission levels, diagnostic trouble codes (DTCs), airbag status, windshield wiper status, lights and indicators, and/or cruise control status. Vehicle telemetry data may be utilized for various purposes, including, for example, fleet management of multiple fleet vehicles, driver behavior analysis, predictive vehicle maintenance analysis, emergency response, and/or traffic management. In some examples, vehicle telemetry data may be gathered by multiple vehicles using crowd-sourcing techniques and subsequently transmitted to one or more remote systems (e.g., server systems) for aggregation, processing, analysis, and/or action. However, acquisition and transmission of vehicle telemetry data may be resource intensive, requiring utilization of vehicle computational resources to monitor vehicle sensors and utilization of cellular network infrastructure for data transmission.

Thus, while current systems and methods for requesting and receiving vehicle telemetry data achieve their intended purpose, there is a need for a new and improved system and method for requesting and receiving vehicle telemetry data.

SUMMARY

According to several aspects, a method for requesting and receiving vehicle telemetry data is provided. The method may include receiving telemetry data from one or more of a plurality of vehicles. The method further may include determining a traffic metric based at least in part on the telemetry data. The method further may include comparing the traffic metric to a traffic metric target. The method further may include requesting telemetry data from one or more of the plurality of vehicles based at least in part on comparing the traffic metric to the traffic metric target.

In another aspect of the present disclosure, comparing the traffic metric to the traffic metric target further may include determining the traffic metric target based at least in part on the traffic metric using a traffic signal timing optimization algorithm.

In another aspect of the present disclosure, comparing the traffic metric to the traffic metric target further may include determining a traffic metric deviation between the traffic metric and the traffic metric target. Comparing the traffic metric to the traffic metric target further may include comparing the traffic metric deviation to a predetermined traffic metric deviation threshold.

In another aspect of the present disclosure, requesting the telemetry data further may include decreasing a sampling frequency and a sampling duration in response to determining that the traffic metric deviation is less than or equal to the predetermined traffic metric deviation threshold. Requesting the telemetry data further may include increasing the sampling frequency and the sampling duration in response to determining that the traffic metric deviation is greater than the predetermined traffic metric deviation threshold. Requesting the telemetry data further may include determining a target vehicle percentage based at least in part on the traffic metric deviation. Requesting the telemetry data further may include requesting telemetry data from one or more of the plurality of vehicles based at least in part on the sampling frequency, the sampling duration, and the target vehicle percentage.

In another aspect of the present disclosure, decreasing the sampling frequency and the sampling duration further may include decreasing the sampling frequency by a predetermined sampling frequency increment. The sampling frequency is greater than or equal to a predetermined minimum sampling frequency threshold. Decreasing the sampling frequency and the sampling duration further may include decreasing the sampling duration by a predetermined sampling duration increment. The sampling duration is greater than or equal to a predetermined minimum sampling duration threshold.

In another aspect of the present disclosure, increasing the sampling frequency and the sampling duration further may include increasing the sampling frequency by a predetermined sampling frequency increment. The sampling frequency is less than or equal to a predetermined maximum sampling frequency threshold. Increasing the sampling frequency and the sampling duration further may include increasing the sampling duration by a predetermined sampling duration increment. The sampling duration is less than or equal to a predetermined maximum sampling duration threshold.

In another aspect of the present disclosure, determining the target vehicle percentage further may include determining a traffic metric confidence based at least in part on the traffic metric deviation. Determining the target vehicle percentage further may include determining the target vehicle percentage based at least in part on the traffic metric confidence. The target vehicle percentage is negatively correlated with the traffic metric confidence.

In another aspect of the present disclosure, requesting the telemetry data from one or more of the plurality of vehicles further may include transmitting a plurality of telemetry data requests to a subset of the plurality of vehicles. A frequency of transmission of the plurality of telemetry data requests is equal to the sampling frequency. A duration of sampling of each of the plurality of telemetry data requests is equal to the sampling duration. The subset of the plurality of vehicles is determined based at least in part on the target vehicle percentage.

In another aspect of the present disclosure, receiving the traffic metric further may include receiving the traffic metric using a server communication system. The traffic metric is related to a transit of one or more of the plurality of vehicles through a traffic signal controlled intersection. The traffic metric includes at least one of: an average speed while transiting the traffic signal controlled intersection, a control delay while transiting the traffic signal controlled intersection, and a quantity of stops while transiting the traffic signal controlled intersection.

In another aspect of the present disclosure, transmitting the plurality of telemetry data requests further may include determining the subset of the plurality of vehicles based at least in part on a geographical location of each of the plurality of vehicles relative to a geographical location of the traffic signal controlled intersection.

According to several aspects, a system for requesting and receiving vehicle telemetry data is provided. The system may include a server communication system and a server controller in electrical communication with the server communication system. The server controller is programmed to receive telemetry data from one or more of a plurality of vehicles using the server communication system. The telemetry data is related to a transit of one or more of the plurality of vehicles through a traffic signal controlled intersection. The server controller is further programmed to determine a traffic metric based at least in part on the telemetry data. The server controller is further programmed to determine a traffic metric deviation between the traffic metric and a traffic metric target. The traffic metric target is determined based at least in part on the traffic metric using a traffic signal timing optimization algorithm. The server controller is further programmed to compare the traffic metric deviation to a predetermined traffic metric deviation threshold. The server controller is further programmed to request telemetry data from one or more of the plurality of vehicles using the server communication system based at least in part on comparing the traffic metric to the traffic metric target.

In another aspect of the present disclosure, to request the telemetry data, the server controller is further programmed to decrease a sampling frequency and a sampling duration in response to determining that the traffic metric deviation is less than or equal to the predetermined traffic metric deviation threshold. To request the telemetry data, the server controller is further programmed to increase the sampling frequency and the sampling duration in response to determining that the traffic metric deviation is greater than the predetermined traffic metric deviation threshold. To request the telemetry data, the server controller is further programmed to determine a target vehicle percentage based at least in part on the traffic metric deviation. To request the telemetry data, the server controller is further programmed to request the telemetry data from one or more of the plurality of vehicles based at least in part on the sampling frequency, the sampling duration, and the target vehicle percentage.

In another aspect of the present disclosure, to decrease the sampling frequency and the sampling duration, the server controller is further programmed to decrease the sampling frequency by a predetermined sampling frequency increment. The sampling frequency is greater than or equal to a predetermined minimum sampling frequency threshold. To decrease the sampling frequency and the sampling duration, the server controller is further programmed to decrease the sampling duration by a predetermined sampling duration increment. The sampling duration is greater than or equal to a predetermined minimum sampling duration threshold.

In another aspect of the present disclosure, to increase the sampling frequency and the sampling duration, the server controller is further programmed to increase the sampling frequency by a predetermined sampling frequency increment. The sampling frequency is less than or equal to a predetermined maximum sampling frequency threshold. To increase the sampling frequency and the sampling duration, the server controller is further programmed to increase the sampling duration by a predetermined sampling duration increment. The sampling duration is greater than or equal to a predetermined maximum sampling duration threshold.

In another aspect of the present disclosure, to determine the target vehicle percentage, the server controller is further programmed to determine a traffic metric confidence based at least in part on the traffic metric deviation. To determine the target vehicle percentage, the server controller is further programmed to determine the target vehicle percentage based at least in part on the traffic metric confidence. The target vehicle percentage is negatively correlated with the traffic metric confidence.

In another aspect of the present disclosure, to request the telemetry data from one or more of the plurality of vehicles, the server controller is further programmed to transmit a plurality of telemetry data requests to a subset of the plurality of vehicles using the server communication system. A frequency of transmission of the plurality of telemetry data requests is equal to the sampling frequency. A duration of sampling of each of the plurality of telemetry data requests is equal to the sampling duration. The subset of the plurality of vehicles is determined based at least in part on the target vehicle percentage.

In another aspect of the present disclosure, to transmit the plurality of telemetry data requests, the server controller is further programmed to determine the subset of the plurality of vehicles based at least in part on a geographical location of each of the plurality of vehicles relative to a geographical location of the traffic signal controlled intersection.

According to several aspects, a method for requesting and receiving vehicle telemetry data is provided. The method may include receiving telemetry data using a server communication system. The telemetry data is related to a transit of one or more of a plurality of vehicles through a traffic signal controlled intersection. The method further may include determining a traffic metric based at least in part on the telemetry data. The traffic metric includes at least one of: an average speed while transiting the traffic signal controlled intersection, a control delay while transiting the traffic signal controlled intersection, and a quantity of stops while transiting the traffic signal controlled intersection. The method further may include determining a traffic metric deviation between the traffic metric and a traffic metric target. The traffic metric target is determined based at least in part on the traffic metric using a traffic signal timing optimization algorithm. The method further may include comparing the traffic metric deviation to a predetermined traffic metric deviation threshold. The method further may include transmitting a plurality of telemetry data requests to a subset of the plurality of vehicles. A frequency of transmission of the plurality of telemetry data requests is equal to a sampling frequency. A duration of sampling of each of the plurality of telemetry data requests is equal to a sampling duration. The subset of the plurality of vehicles is determined based at least in part on a target vehicle percentage. The subset of the plurality of vehicles is determined based at least in part on a geographical location of each of the plurality of vehicles relative to a geographical location of the traffic signal controlled intersection.

In another aspect of the present disclosure, transmitting the plurality of telemetry data requests further may include decreasing the sampling frequency and the sampling duration in response to determining that the traffic metric deviation is less than or equal to the predetermined traffic metric deviation threshold. Transmitting the plurality of telemetry data requests further may include increasing the sampling frequency and the sampling duration in response to determining that the traffic metric deviation is greater than the predetermined traffic metric deviation threshold. Transmitting the plurality of telemetry data requests further may include determining the target vehicle percentage based at least in part on the traffic metric deviation. Transmitting the plurality of telemetry data requests further may include transmitting the plurality of telemetry data requests based at least in part on the sampling frequency, the sampling duration, and the target vehicle percentage.

In another aspect of the present disclosure, determining the target vehicle percentage further may include determining a traffic metric confidence based at least in part on the traffic metric deviation. Determining the target vehicle percentage further may include determining the target vehicle percentage based at least in part on the traffic metric confidence. The target vehicle percentage is negatively correlated with the traffic metric confidence.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, collection of vehicle telemetry data from one or more of a plurality of vehicles may be advantageous. For example, vehicle telemetry data may be used to determine roadway traffic conditions and optimize the operation of traffic control infrastructure, such as, for example, a traffic signal controlled intersection. However, acquisition and transmission of telemetry data may be resource intensive. Therefore, the present disclosure provides a new and improved system and method for requesting and receiving vehicle telemetry data.

Figure 1:
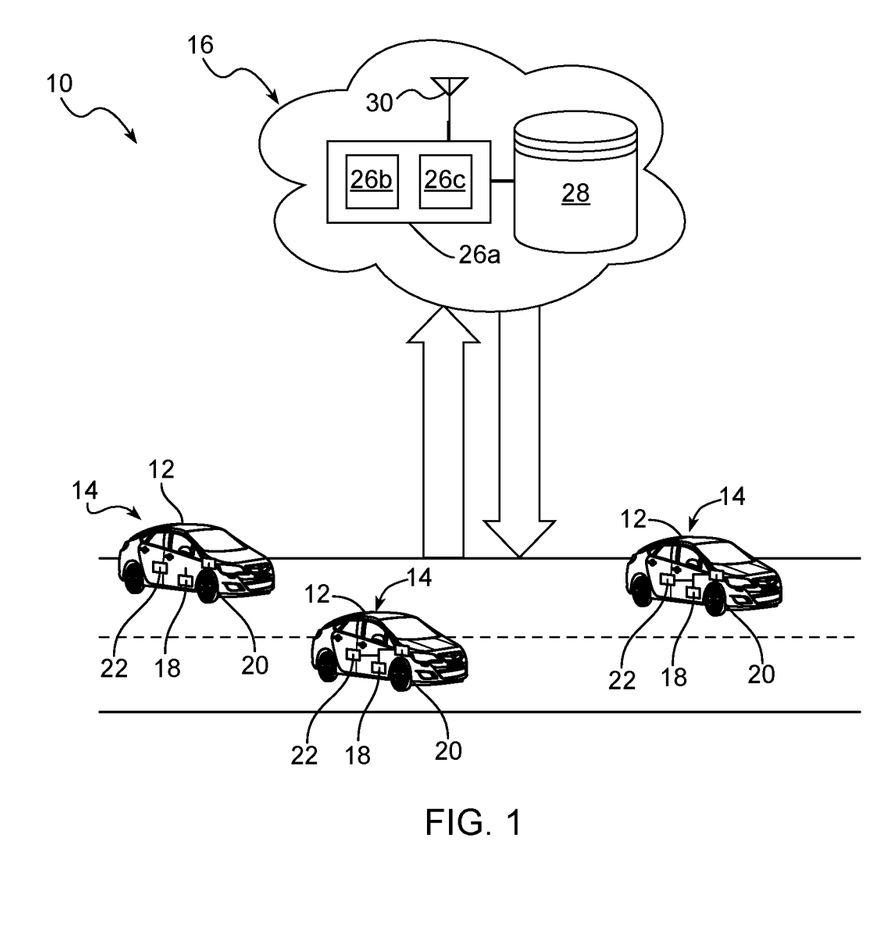
FIG. 1 is a schematic diagram of a system for requesting and receiving vehicle telemetry data, according to an exemplary embodiment.

Referring to FIG. 1, a schematic diagram of a system 10 for requesting and receiving vehicle telemetry data is shown. The system 10 includes a plurality of vehicles 12, each of the plurality of vehicles 12 including a vehicle system 14. The system 10 further includes a server system 16.

The vehicle system 14 includes a vehicle controller 18, a plurality of vehicle sensors 20, and a vehicle communication system 22.

The vehicle controller 18 is used to implement a method 100 for requesting and receiving vehicle telemetry data, as will be described below. The vehicle controller 18 includes at least one processor and a non-transitory computer readable storage device or media. The processor may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 12. The vehicle controller 18 may also consist of multiple controllers which are in electrical communication with each other. The vehicle controller 18 may be inter-connected with additional systems and/or controllers of the vehicle 12, allowing the vehicle controller 18 to access data such as, for example, speed, acceleration, braking, and steering angle of the vehicle 12.

The vehicle controller 18 is in electrical communication with the plurality of vehicle sensors 20 and the vehicle communication system 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure.

The plurality of vehicle sensors 20 are used to acquire telemetry data of the vehicle 12. In the scope of the present disclosure, telemetry data includes, for example, engine RPM, vehicle speed, fuel level, engine temperature, odometer reading, battery voltage, brake system status, transmission data, tire pressure, GNSS location, acceleration and deceleration, steering angle, suspension system data, exhaust emission levels, diagnostic trouble codes (DTCs), airbag status, windshield wiper status, lights and indicators, and cruise control status. In exemplary embodiment, the plurality of vehicle sensors 20 includes sensors to determine performance data about the vehicle 12. In a non-limiting example, the plurality of vehicle sensors 20 further includes at least one of: a motor speed sensor, a motor torque sensor, an electric drive motor voltage and/or current sensor, an accelerator pedal position sensor, a brake position sensor, a coolant temperature sensor, a cooling fan speed sensor, a wheel speed sensor, and a transmission oil temperature sensor.

In another exemplary embodiment, the plurality of vehicle sensors 20 further includes sensors to determine information about an environment within the vehicle 12. In a non-limiting example, the plurality of vehicle sensors 20 further includes at least one of a seat occupancy sensor, a cabin air temperature sensor, a cabin motion detection sensor, a cabin camera, a cabin microphone, and/or the like.

In another exemplary embodiment, the plurality of vehicle sensors 20 further includes sensors to determine information about an environment surrounding the vehicle 12. In a non-limiting example, the plurality of vehicle sensors 20 further includes at least one of an ambient air temperature sensor, a barometric pressure sensor, a global navigation satellite system (GNSS), and/or a photo and/or video camera which is positioned to view the environment in front of the vehicle 12.

The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS may be integrated with the vehicle controller 18 (e.g., on a same circuit board with the vehicle controller 18 or otherwise a part of the vehicle controller 18) without departing from the scope of the present disclosure.

In another exemplary embodiment, at least one of the plurality of vehicle sensors 20 is a perception sensor capable of perceiving objects and/or measuring distances in the environment surrounding the vehicle 12. In a non-limiting example, the plurality of vehicle sensors 20 includes a stereoscopic camera having distance measurement capabilities. In one example, at least one of the plurality of vehicle sensors 20 is affixed inside of the vehicle 12, for example, in a headliner of the vehicle 12, having a view through a windscreen of the vehicle 12. In another example, at least one of the plurality of vehicle sensors 20 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 20 are in electrical communication with the vehicle controller 18 as discussed above.

The vehicle communication system 22 is used by the vehicle controller 18 to communicate with other systems external to the vehicle 12. For example, the vehicle communication system 22 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 22 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 22 may further include an embedded universal integrated circuit card (eUICC) configured to store at least one cellular connectivity configuration profile, for example, an embedded subscriber identity module (eSIM) profile. The vehicle communication system 22 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 22 may include one or more antennas and/or communication transceivers for receiving and/or transmitting signals, such as cooperative sensing messages (CSMs). The vehicle communication system 22 is configured to wirelessly communicate information between the vehicle 12 and another vehicle. Further, the vehicle communication system 22 is configured to wirelessly communicate information between the vehicle 12 and infrastructure or other vehicles. It should be understood that the vehicle communication system 22 may be integrated with the vehicle controller 18 (e.g., on a same circuit board with the vehicle controller 18 or otherwise a part of the vehicle controller 18) without departing from the scope of the present disclosure.

With continued reference to FIG. 1, the server system 16 includes a server controller 26a in electrical communication with a database 28 and a server communication system 30. In a non-limiting example, the server system 16 is located in a server farm, datacenter, or the like, and connected to the internet using the server communication system 30. The server controller 26a includes at least one server processor 26b and a server non-transitory computer readable storage device or server media 26c. The description of the type and configuration given above for the vehicle controller 18 also applies to the server controller 26a. In some examples, the server controller 26a may differ from the vehicle controller 18 in that the server controller 26a is capable of a higher processing speed, includes more memory, includes more inputs/outputs, and/or the like. In a non-limiting example, the server processor 26b and server media 26c of the server controller 26a are similar in structure and/or function to the processor and the media of the vehicle controller 18, as described above. The database 28 is used to store telemetry data received from the plurality of vehicles 12, as will be discussed in greater detail below. The server communication system 30 is used to communicate with external systems, such as, for example, the vehicle controller 18 via the vehicle communication system 22. In a non-limiting example, server communication system 30 is similar in structure and/or function to the vehicle communication system 22 of the vehicle system 14, as described above. In some examples, the server communication system 30 may differ from the vehicle communication system 22 in that the server communication system 30 is capable of higher power signal transmission, more sensitive signal reception, higher bandwidth transmission, additional transmission/reception protocols, and/or the like.

Figure 2:
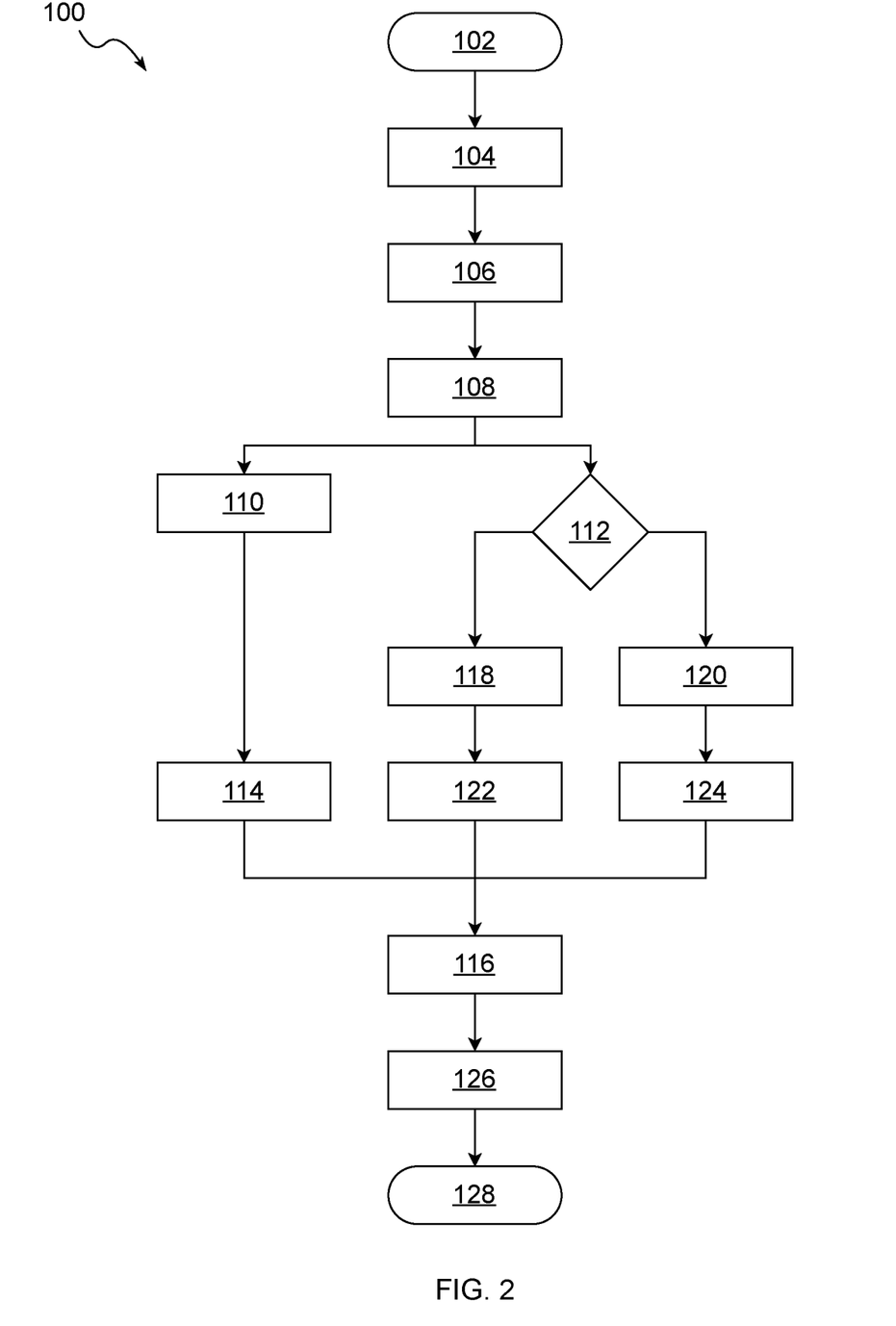
FIG. 2 is a flowchart of the method for requesting and receiving vehicle telemetry data, according to an exemplary embodiment.

Referring to FIG. 2, a flowchart of the method 100 for requesting and receiving vehicle telemetry data is shown. The method 100 begins at block 102 and proceeds to block 104. At block 104, the server controller 26a receives telemetry data from one or more of the plurality of vehicles 12 using the server communication system 30. The telemetry data is saved in the database 28 of the server system 16. The telemetry data includes, for example, a vehicle location, a vehicle speed, a vehicle acceleration, a vehicle steering angle, and/or the like. In an exemplary embodiment, the vehicle controller 18 of each of the plurality of vehicles 12 collects telemetry data using the plurality of vehicle sensors 20 for transmission to the server system 16 using the vehicle communication system 22. After block 104, the method 100 proceeds to block 106.

At block 106, the server controller 26a determines a traffic metric based at least in part on the telemetry data received at block 104. In an exemplary embodiment, the traffic metric is related to a transit of one or more of the plurality of vehicles 12 through a traffic signal controlled intersection. In the scope of the present disclosure, a traffic signal controlled intersection is an intersection in a roadway for which a flow of traffic is controlled by at least one active traffic control device (i.e., a traffic signal). In a non-limiting example, the traffic metric includes at least one of: an average speed while transiting the traffic signal controlled intersection, a control delay while transiting the traffic signal controlled intersection, and a quantity of stops while transiting the traffic signal controlled intersection.

In the scope of the present disclosure, the control delay is defined as a time from when a vehicle 12 begins decelerating from an initial vehicle speed to stop at the traffic signal controlled intersection (i.e., because the traffic signal has turned red) to when the vehicle 12 returns to the initial vehicle speed after transiting the traffic signal controlled intersection (i.e., after the traffic signal has turned green), including any time spent waiting at the intersection (e.g., waiting at a red light). In the scope of the present disclosure, the quantity of stops while transiting the traffic signal controlled intersection is defined as a number of times which the vehicle 12 comes to a complete stop before transiting the traffic signal controlled intersection.

In an exemplary embodiment, the server controller 26a determines the traffic metric based at least in part on the telemetry data received at block 104. In a non-limiting example, the server controller 26a uses signal and/or data processing techniques to analyze the telemetry data and determine the traffic metric. In a non-limiting example, the server controller 26a analyzes the velocity and geographical location of the vehicle 12 relative to a geographical location of the traffic signal controlled intersection to determine the traffic metric. In another non-limiting example, the server controller 26a uses a machine learning model trained to recognize patterns in the telemetry data associated with the traffic metric (e.g., control delay and/or quantity of stops). It should be understood that the server controller 26a may determine one or more traffic metrics, and that the entirety of the present disclosure is equally applicable to embodiments including a plurality of traffic metrics. After block 106, the method 100 proceeds to block 108.

At block 108, the server controller 26a determines a traffic metric deviation between the traffic metric received at block 104 and a traffic metric target. In the scope of the present disclosure, the traffic metric target is an ideal value of the traffic metric to optimize traffic flow through the traffic signal controlled intersection. In a non-limiting example, the traffic metric target includes, for example, a target average speed while transiting the traffic signal controlled intersection, a target control delay while transiting the traffic signal controlled intersection, and a target quantity of stops while transiting the traffic signal controlled intersection. Determination of the traffic metric target will be discussed in greater detail below. After block 108, the method 100 proceeds to blocks 110 and 112.

At block 110, the server controller 26a determines a traffic metric confidence based at least in part on the traffic metric deviation determined at block 108. In an exemplary embodiment, the traffic metric confidence is negatively correlated with the traffic metric deviation. For example, if the traffic metric deviation is high, the traffic metric confidence is low. In a non-limiting example, the relationship between the traffic metric confidence and the traffic metric deviation is a linear relationship. In another non-limiting example, the relationship between the traffic metric confidence and the traffic metric deviation is a higher order polynomial relationship. In another non-limiting example, the relationship between the traffic metric confidence and the traffic metric deviation is a rational or radial relationship. It should be understood that any mathematical relationship between the traffic metric deviation and the traffic metric confidence is within the scope of the present disclosure. After block 110, the method 100 proceeds to block 114.

At block 114, the server controller 26a determines a target vehicle percentage based at least in part on the traffic metric confidence determined at block 110. In the scope of the present disclosure, the target vehicle percentage quantifies a percentage of the plurality of vehicles 12 within a predetermined geographical region around the traffic signal controlled intersection (e.g., a one-kilometer circle centered on a center of the traffic signal controlled intersection) from which telemetry data will be requested. For example, if the target vehicle percentage is sixty percent, sixty percent of the plurality of vehicles 12 within the predetermined geographical region around the traffic signal controlled intersection will be polled for telemetry data, as will be discussed in greater detail below.

In an exemplary embodiment, the target vehicle percentage is negatively correlated with the traffic metric confidence. For example, if the traffic metric confidence is high, the target vehicle percentage is low. In a non-limiting example, the relationship between the target vehicle percentage and the traffic metric confidence is a linear relationship. In another non-limiting example, the relationship between the target vehicle percentage and the traffic metric confidence is a higher order polynomial relationship. In another non-limiting example, the relationship between the target vehicle percentage and the traffic metric confidence is a rational or radial relationship. It should be understood that any mathematical relationship between the traffic metric confidence and the target vehicle percentage is within the scope of the present disclosure. In an exemplary embodiment, the target vehicle percentage is greater than a predetermined minimum target vehicle percentage (e.g., ten percent) and less than a predetermined maximum target vehicle percentage (e.g., ninety percent). After block 114, the method 100 proceeds to block 116, as will be discussed in greater detail below.

At block 112, the server controller 26a compares the traffic metric deviation determined at block 108 to a predetermined traffic metric deviation threshold (e.g., ten percent). In an exemplary embodiment, the predetermined traffic metric deviation threshold is determined experimentally and may be adjusted to adjust a sensitivity of the system 10. If the traffic metric deviation is less than or equal to the traffic metric deviation threshold, the method 100 proceeds to block 118. If the traffic metric deviation is greater than the traffic metric deviation threshold, the method 100 proceeds to block 120.

At block 118, the server controller 26a decreases a sampling frequency. In the scope of the present disclosure, the sampling frequency is a frequency with which the server system 16 requests telemetry data from one or more of the plurality of vehicles 12. In an exemplary embodiment, to decrease the sampling frequency, the server controller 26a increases a sampling period (i.e., a time between each request to the plurality of vehicles 12). In an exemplary embodiment, the sampling frequency is decreased by a predetermined sampling frequency increment (e.g., ten cycles per minute, five percent, or the like). In an exemplary embodiment, the sampling frequency is not decreased below a predetermined minimum sampling frequency threshold (i.e., the sampling frequency is always greater than or equal to the predetermined minimum sampling frequency threshold). In an exemplary embodiment, the predetermined sampling frequency increment is a constant value stored in the server media 26c. In another exemplary embodiment, the predetermined sampling frequency increment is determined based at least in part on the traffic metric deviation. After block 118, the method proceeds to block 122.

At block 122, the server controller 26a decreases a sampling duration. In the scope of the present disclosure, the sampling duration is a duration of the telemetry data requested by the server controller 26a. For example, the server controller 26a may request thirty seconds of telemetry data from the plurality of vehicles 12. Therefore, the plurality of vehicles 12 would stream telemetry data to the server controller 26a for thirty seconds, and the sampling duration is thirty seconds. The sampling duration may also be referred to as a sampling duty cycle. In an exemplary embodiment, the sampling duration is decreased by a predetermined sampling duration increment (e.g., ten seconds, five percent, or the like). In an exemplary embodiment, the sampling duration is not decreased below a predetermined minimum sampling duration threshold (i.e., the sampling duration is always greater than or equal to the predetermined minimum sampling duration threshold). In an exemplary embodiment, the predetermined sampling duration increment is a constant value stored in the server media 26c. In another exemplary embodiment, the predetermined duration frequency increment is determined based at least in part on the traffic metric deviation. After block 122, the method proceeds to block 116, as will be discussed in greater detail below.

At block 120, the server controller 26a increases the sampling frequency. In an exemplary embodiment, to increase the sampling frequency, the server controller 26a decreases the sampling period. In an exemplary embodiment, the sampling frequency is increased by a predetermined sampling frequency increment (e.g., ten cycles per minute, five percent, or the like). In an exemplary embodiment, the sampling frequency is not increased above a predetermined maximum sampling frequency threshold (i.e., the sampling frequency is always less than or equal to the predetermined maximum sampling frequency threshold). In an exemplary embodiment, the predetermined sampling frequency increment is a constant value stored in the server media 26c. In another exemplary embodiment, the predetermined sampling frequency increment is determined based at least in part on the traffic metric deviation. After block 120, the method proceeds to block 124.

At block 124, the server controller 26a increases the sampling duration. In an exemplary embodiment, the sampling duration is increased by a predetermined sampling duration increment (e.g., ten seconds, five percent, or the like). In an exemplary embodiment, the sampling duration is not increased above a predetermined maximum sampling duration threshold (i.e., the sampling duration is always less than or equal to the predetermined maximum sampling duration threshold). In an exemplary embodiment, the predetermined sampling duration increment is a constant value stored in the server media 26c. In another exemplary embodiment, the predetermined duration frequency increment is determined based at least in part on the traffic metric deviation. After block 124, the method proceeds to block 116.

At block 116, the server controller 26a uses the server communication system 30 to transmit a plurality of telemetry data requests to a subset of the plurality of vehicles 12. In an exemplary embodiment, the subset of the plurality of vehicles 12 is determined based on the target vehicle percentage determined at block 114. The target vehicle percentage quantifies a percentage of the plurality of vehicles 12 within the predetermined geographical region around the traffic signal controlled intersection (e.g., a one-kilometer circle centered on a center of the traffic signal controlled intersection) from which telemetry data is requested. For example, if the target vehicle percentage is sixty percent, sixty percent of the plurality of vehicles 12 within the predetermined geographical region around the traffic signal controlled intersection will receive the plurality of telemetry data requests.

The frequency with which the plurality of telemetry data requests are transmitted is referred to as a frequency of transmission of the plurality of telemetry data requests. In an exemplary embodiment, the frequency of transmission of the plurality of telemetry data requests is equal to the sampling frequency as adjusted at block 118 or block 120. Each of the plurality of telemetry data requests includes a duration of sampling. The duration of sampling is used by the vehicle controller 18 to determine how long to stream data from the vehicle 12 to the server system 16. In an exemplary embodiment, the duration of sampling of each of the plurality of telemetry data requests is equal to the sampling duration as adjusted at block 122 or block 124.

The plurality of telemetry data requests are transmitted by the server system 16 using the server communication system 30 and received by the vehicle communication system 22 of the subset of the plurality of vehicles 12. The subset of the plurality of vehicles 12 subsequently stream telemetry data to the server communication system 30 of the server system 16 according to the duration of sampling. The server system 16 receives the telemetry data as discussed above in reference to block 104. After block 116, the method 100 proceeds to block 126.

At block 126, the server controller 26a determines the traffic metric target. In the scope of the present disclosure, the traffic metric target is an ideal value of the traffic metric to optimize traffic flow through the traffic signal controlled intersection. In a non-limiting example, the traffic metric target includes, for example, a target average speed while transiting the traffic signal controlled intersection, a target control delay while transiting the traffic signal controlled intersection, and a target quantity of stops while transiting the traffic signal controlled intersection. In an exemplary embodiment, the traffic metric target is determined using a traffic signal timing optimization algorithm. In a non-limiting example, the traffic signal timing optimization algorithm functions by considering various factors, such as traffic volume, vehicle queues, traffic metrics, and pedestrian activity. The traffic signal timing optimization algorithm calculates the traffic metric target. The traffic signal timing optimization algorithm may also calculate an optimal signal timing plan for the traffic signal. In another non-limiting example, the traffic signal timing optimization algorithm is implemented as discussed in U.S. application Ser. No. 18/308,996, titled "OPTIMIZING TRAFFIC SIGNAL TIMING USING VEHICLE TELEMETRY DATA", filed on Apr. 28, 2023, the entire contents of which is hereby incorporated by reference. The traffic metric target determined at block 126 is used at block 108 during a subsequent execution of the method 100. After block 126, the method 100 proceeds to enter a standby state at block 128.

In an exemplary embodiment, the server controller 26a repeatedly exits the standby state 128 and restarts the method 100 at block 102. In a non-limiting example, the server controller 26a exits the standby state 128 and restarts the method 100 on a timer, for example, every three hundred milliseconds.

The system 10 and method 100 of the present disclosure offer several advantages. In an exemplary embodiment, the vehicle telemetry data received using the system 10 and method 100 may be used by a traffic signal timing optimization algorithm to adjust signal timing plans for traffic signal controlled intersections. In a non-limiting example, by adjusting the sampling frequency and the sampling duration based on conditions at the traffic signal controlled intersection, resource use for data transmission between the plurality of vehicles 12 and the server system 16 may be optimized. Furthermore, by reducing the sampling frequency and sampling duration when the traffic metric target is satisfied, computational resource use for the plurality of vehicles 12 is optimized.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for requesting and receiving vehicle telemetry data, the method comprising:
    receiving telemetry data from one or more of a plurality of vehicles;
    determining a traffic metric based at least in part on the telemetry data;
    comparing the traffic metric to a traffic metric target by determining a traffic metric deviation between the traffic metric and the traffic metric target and comparing the traffic metric deviation to a predetermined traffic metric deviation threshold;
    requesting telemetry data from a subset of the one or more of the plurality of vehicles based at least in part on comparing the traffic metric to the traffic metric target by:
        decreasing a sampling frequency and a sampling duration in response to determining that the traffic metric deviation is less than or equal to the predetermined traffic metric deviation threshold;
        increasing the sampling frequency and the sampling duration in response to determining that the traffic metric deviation is greater than the predetermined traffic metric deviation threshold;
        determining a target vehicle percentage based at least in part on the traffic metric deviation; and
        requesting telemetry data from the subset of the one or more of the plurality of vehicles based at least in part on the sampling frequency, the sampling duration, and the target vehicle percentage; and
    controlling, via a server controller, a traffic signal in one or more traffic signal controlled intersections by adjusting signal timing plans based on telemetry data received in response to requesting telemetry data from the subset of the one or more of the plurality of vehicles.

2. The method of claim 1, wherein comparing the traffic metric to the traffic metric target further comprises:
    determining the traffic metric target based at least in part on the traffic metric using a traffic signal timing optimization algorithm.

3. The method of claim 1, wherein decreasing the sampling frequency and the sampling duration further comprises:
    decreasing the sampling frequency by a predetermined sampling frequency increment, wherein the sampling frequency is greater than or equal to a predetermined minimum sampling frequency threshold; and
    decreasing the sampling duration by a predetermined sampling duration increment, wherein the sampling duration is greater than or equal to a predetermined minimum sampling duration threshold.

4. The method of claim 1, wherein increasing the sampling frequency and the sampling duration further comprises:
    increasing the sampling frequency by a predetermined sampling frequency increment, wherein the sampling frequency is less than or equal to a predetermined maximum sampling frequency threshold; and
    increasing the sampling duration by a predetermined sampling duration increment, wherein the sampling duration is less than or equal to a predetermined maximum sampling duration threshold.

5. The method of claim 1, wherein determining the target vehicle percentage further comprises:
    determining a traffic metric confidence based at least in part on the traffic metric deviation; and
    determining the target vehicle percentage based at least in part on the traffic metric confidence, wherein the target vehicle percentage is negatively correlated with the traffic metric confidence.

6. The method of claim 1, wherein requesting the telemetry data from one or more of the plurality of vehicles further comprises:
    transmitting a plurality of telemetry data requests to the subset of the plurality of vehicles, wherein a frequency of transmission of the plurality of telemetry data requests is equal to the sampling frequency, wherein a duration of sampling of each of the plurality of telemetry data requests is equal to the sampling duration, and wherein the subset of the plurality of vehicles is determined based at least in part on the target vehicle percentage.

7. The method of claim 6, wherein receiving the traffic metric further comprises:
    receiving the traffic metric using a server communication system, wherein the traffic metric is related to a transit of one or more of the plurality of vehicles through one or more of the traffic signal controlled intersections, and wherein the traffic metric includes at least one of: an average speed while transiting the traffic signal controlled intersection, a control delay while transiting the traffic signal controlled intersection, and a quantity of stops while transiting the traffic signal controlled intersection.

8. The method of claim 7, wherein transmitting the plurality of telemetry data requests further comprises:
    determining the subset of the plurality of vehicles based at least in part on a geographical location of each of the plurality of vehicles relative to a geographical location of the traffic signal controlled intersection.

9. A system for requesting and receiving vehicle telemetry data, the system comprising:

a server communication system;

a server controller in electrical communication with the server communication system, wherein the server controller is programmed to:
- receive telemetry data from one or more of a plurality of vehicles using the server communication system, wherein the telemetry data is related to a transit of one or more of the plurality of vehicles through a traffic signal controlled intersection;
- determine a traffic metric based at least in part on the telemetry data;
- determine a traffic metric deviation between the traffic metric and a traffic metric target, wherein the traffic metric target is determined based at least in part on the traffic metric using a traffic signal timing optimization algorithm;
- compare the traffic metric deviation to a predetermined traffic metric deviation threshold;
- request telemetry data from a subset of the one or more of the plurality of vehicles using the server communication system based at least in part on comparing the traffic metric to the traffic metric target by:
  - decreasing a sampling frequency and a sampling duration in response to determining that the traffic metric deviation is less than or equal to the predetermined traffic metric deviation threshold;
  - increasing the sampling frequency and the sampling duration in response to determining that the traffic metric deviation is greater than the predetermined traffic metric deviation threshold;
  - determining a target vehicle percentage based at least in part on the traffic metric deviation; and
  - requesting telemetry data from the subset of the one or more of the plurality of vehicles based at least in part on the sampling frequency, the sampling duration, and the target vehicle percentage; and
- control a traffic signal in one or more traffic signal controlled intersections by adjusting signal timing plans based on telemetry data received in response to requesting telemetry data from the subset of the one or more of the plurality of vehicles.

10. The system of claim 9, wherein to decrease the sampling frequency and the sampling duration, the server controller is further programmed to:
- decrease the sampling frequency by a predetermined sampling frequency increment, wherein the sampling frequency is greater than or equal to a predetermined minimum sampling frequency threshold; and
- decrease the sampling duration by a predetermined sampling duration increment, wherein the sampling duration is greater than or equal to a predetermined minimum sampling duration threshold.

11. The system of claim 10, wherein to increase the sampling frequency and the sampling duration, the server controller is further programmed to:
- increase the sampling frequency by a predetermined sampling frequency increment, wherein the sampling frequency is less than or equal to a predetermined maximum sampling frequency threshold; and
- increase the sampling duration by a predetermined sampling duration increment, wherein the sampling duration is greater than or equal to a predetermined maximum sampling duration threshold.

12. The system of claim 11, wherein to determine the target vehicle percentage, the server controller is further programmed to:
- determine a traffic metric confidence based at least in part on the traffic metric deviation; and
- determine the target vehicle percentage based at least in part on the traffic metric confidence, wherein the target vehicle percentage is negatively correlated with the traffic metric confidence.

13. The system of claim 12, wherein to request the telemetry data from one or more of the plurality of vehicles, the server controller is further programmed to:
- transmit a plurality of telemetry data requests to the subset of the plurality of vehicles using the server communication system, wherein a frequency of transmission of the plurality of telemetry data requests is equal to the sampling frequency, wherein a duration of sampling of each of the plurality of telemetry data requests is equal to the sampling duration, and wherein the subset of the plurality of vehicles is determined based at least in part on the target vehicle percentage.

14. The system of claim 13, wherein to transmit the plurality of telemetry data requests, the server controller is further programmed to:
- determine the subset of the plurality of vehicles based at least in part on a geographical location of each of the plurality of vehicles relative to a geographical location of the traffic signal controlled intersection.

15. A method for requesting and receiving vehicle telemetry data, the method comprising:
- receiving telemetry data using a server communication system, wherein the telemetry data is related to a transit of one or more of a plurality of vehicles through a traffic signal controlled intersection;
- determining a traffic metric based at least in part on the telemetry data, wherein the traffic metric includes at least one of: an average speed while transiting the traffic signal controlled intersection, a control delay while transiting the traffic signal controlled intersection, and a quantity of stops while transiting the traffic signal controlled intersection;
- determining a traffic metric deviation between the traffic metric and a traffic metric target, wherein the traffic metric target is determined based at least in part on the traffic metric using a traffic signal timing optimization algorithm;
- comparing the traffic metric deviation to a predetermined traffic metric deviation threshold;
- transmitting a plurality of telemetry data requests to a subset of the plurality of vehicles by:
  - decreasing the sampling frequency and the sampling duration in response to determining that the traffic metric deviation is less than or equal to the predetermined traffic metric deviation threshold;
  - increasing the sampling frequency and the sampling duration in response to determining that the traffic metric deviation is greater than the predetermined traffic metric deviation threshold;
  - determining the target vehicle percentage based at least in part on the traffic metric deviation; and
  - transmitting the plurality of telemetry data requests based at least in part on the sampling frequency, the sampling duration, and the target vehicle percentage,
  - wherein a frequency of transmission of the plurality of telemetry data requests is equal to a sampling frequency, wherein a duration of sampling of each of the plurality of telemetry data requests is equal to a sampling duration, wherein the subset of the plurality of vehicles is determined based at least in part on a target vehicle percentage, and wherein the subset of the plurality of vehicles is determined based at least in part on a geographical location of each of the plurality of vehicles relative to a geographical location of the traffic signal controlled intersection; and controlling a traffic signal in the traffic signal controlled intersection by adjusting signal timing plans based on telemetry data received in response to requesting telemetry data from the one or more of the plurality of vehicles.

16. The method of claim 15, wherein determining the target vehicle percentage further comprises:

determining a traffic metric confidence based at least in part on the traffic metric deviation; and determining the target vehicle percentage based at least in part on the traffic metric confidence, wherein the target vehicle percentage is negatively correlated with the traffic metric confidence.

* * * * *